C. H. ROBERTS.
Saw-Mill Dog.
No. 216,893.         Patented June 24, 1879.
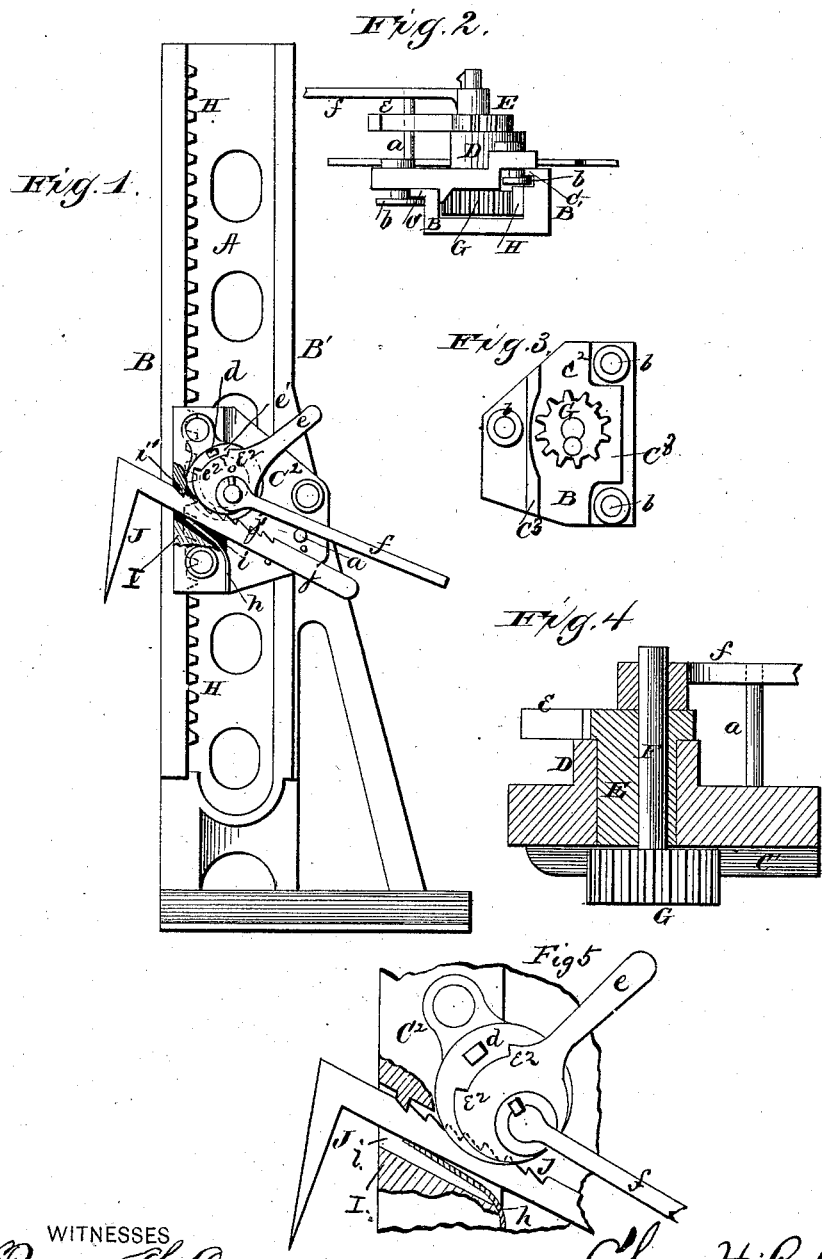
WITNESSES                    INVENTOR
Chas. H. Roberts
By H. J. Ennis
ATTORNEY

UNITED STATES PATENT OFFICE.

CHARLES H. ROBERTS, OF EVANSVILLE, INDIANA.

IMPROVEMENT IN SAW-MILL DOGS.

Specification forming part of Letters Patent No. 216,893, dated June 24, 1879; application filed April 25, 1879.

*To all whom it may concern:*

Be it known that I, CHARLES H. ROBERTS, of Evansville, in the county of Vanderburg and State of Indiana, have invented certain new and useful Improvements in Saw-Mill Dogs; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

Figure 1 represents a side elevation of a knee-standard in which is mounted my dog-bar, or plate carrying the dog. Fig. 2 is a top view of the same. Fig. 3 is a rear view of my improved dog-bar. Fig. 4 is a transverse sectional view of the same, and Fig. 5 is a view of the dog-bar detached.

This invention relates to new and useful improvements in the class of saw-mill dogs, and more especially to the class employing an adjustable dog-bar; and the invention consists in the general construction and combination of parts, all of which will be hereinafter fully described, and specially pointed out in the claims.

In the drawings, A represents a knee-standard, upon which the working parts of my improved dog are mounted. This standard A is provided on one side with two vertical and parallel right-angled portions, B B', cast with and forming a part of said standard. The portions B B' are, respectively, provided with right-angled flanges C C¹, forming guideways, upon which the dog bar or plate C² is mounted.

Journaled on the inner face of the dog bar or plate are grooved friction-rollers $b$, which engage with the flanges C C¹ of the portions B B' of the standard, the dog bar or plate being also provided with parallel guide-bars $c^3 c^3$, which bear against the inner faces of the flanges C C¹, thus holding the dog bar or plate steady, and preventing lateral movement thereof on the standard.

The dog bar or plate C² is provided with an arbor, D, in which is journaled an adjustable eccentric, E, through which passes a shaft, F, upon one end of which is rigidly mounted a pinion, G, which engages with a vertical rack, H, secured to the inner face of the portion B of the knee-standard.

The shaft F is also provided with a hand-lever, $f$, for turning the same, the circular or revolving movement of the said shaft and pinion mounted thereon being limited by a step, $a$, connected to the dog bar or plate, with which the lever $f$ engages the arbor.

The eccentric E is also provided with a hand-lever, $e$, for turning the same, which is provided with a segmental slot, $e^1$, and projections $e^2 e^2$, which engage with a stop, $d$, on the arbor D, for limiting the circular movement of said eccentric, which is sufficient to throw the pinion on the shaft F in and out of gear with the rack H, all as clearly shown in Figs. 1 and 5 of the drawings.

The dog bar or plate C² is provided with an offset, I, through which an oblique slot, $i$, is made, and through this slot passes the shank $j$ of a dog, J, which is provided with a series of teeth, $j'$, with which a stationary pawl, $i'$, engages, said toothed shank being held in engagement with said pawl by a spring, $h$, all as clearly shown in Fig. 1, thus permitting the dog being adjusted obliquely, and secured in any desired position for engaging with a log nearer to or farther from the standard.

The operation of my improved mill-dog is as follows: The dog bar or plate being adjusted on the standard so that a log will rest against the same, the pinion is thrown out of gear with the rack H by the eccentric, which permits the dog bar or plate being adjusted on the standard until the dog comes in contact with the log. The pinion is then thrown into engagement with the rack H, when, upon turning the shaft and pinion F G, through the medium of the hand-lever $f$, the dog bar or plate will be forced downward and the hook of the dog forced into the log, thus securing it in position while being sawed. The dog passing through the dog-bar in an oblique direction, as shown, tends to force the log snugly against the standard as it is forced into the log. By reversing or turning the pinion through the medium of the shaft and lever in the opposite direction the dog bar or plate will be forced away from the log, thus releasing the dog from contact therewith.

Having thus fully described my invention, what I claim as new, and desire to secure by Letters Patent of the United States, is—

1. The combination, with the knee-standard provided with the rack H, of the dog bar or plate provided with an eccentrically-journaled shaft having a pinion, G, secured thereon, whereby said pinion can be thrown in and out of gear with said rack, substantially as and for the purpose herein shown and described.

2. The knee-standard A, having the right-angled portions B B', with flanges C C¹ and rack H, in combination with the dog-bar C², provided with the friction-wheels b, guide-bars C³, and pinion G, substantially as described, and for the purpose set forth.

3. The combination of the knee-standard provided with the rack H, the dog bar or plate provided with the adjustable eccentric E, and the shaft F, journaled in said eccentric and provided with a pinion and hand-lever, substantially as and for the purpose herein shown and described.

In testimony that I claim the foregoing I have hereunto set my hand this 16th day of April, 1879.

CHARLES H. ROBERTS.

Witnesses:
  JOHN J. KLEINER,
  W. E. HOLLINGSWORTH.